(12) United States Patent
Waters

(10) Patent No.: US 10,245,975 B1
(45) Date of Patent: Apr. 2, 2019

(54) CHILD CAR SEAT SAFETY SYSTEM

(71) Applicant: Keith Waters, Pleasant Valley, NY (US)

(72) Inventor: Keith Waters, Pleasant Valley, NY (US)

(*) Notice: Subject to any disclaimer, the term of this patent is extended or adjusted under 35 U.S.C. 154(b) by 0 days.

(21) Appl. No.: 16/031,154

(22) Filed: Jul. 10, 2018

(51) Int. Cl.
*B60N 2/00* (2006.01)
*B60N 2/90* (2018.01)
*B60N 2/26* (2006.01)

(52) U.S. Cl.
CPC ............ *B60N 2/002* (2013.01); *B60N 2/26* (2013.01); *B60N 2/90* (2018.02); *B60N 2002/981* (2018.02)

(58) Field of Classification Search
CPC ...... B60N 2/002; B60N 2/2812; B60K 28/08; B60Q 9/00
USPC ............. 340/573.1, 457.1, 666, 439, 539.11, 340/425.5, 457, 438, 426.13
See application file for complete search history.

(56) References Cited

U.S. PATENT DOCUMENTS

| 6,812,844 | B1 |  | 11/2004 | Burgess |  |
|---|---|---|---|---|---|
| 6,922,147 | B1 | * | 7/2005 | Viksnins | B60N 2/002 340/573.1 |
| 6,998,988 | B1 | * | 2/2006 | Kalce | B60N 2/002 340/457.1 |
| 7,009,522 | B2 | * | 3/2006 | Flanagan | B60R 99/00 177/136 |
| 7,123,157 | B2 | * | 10/2006 | Best | B60N 2/002 340/666 |
| 7,170,401 | B1 | * | 1/2007 | Cole | B60N 2/002 340/439 |
| 7,250,869 | B2 | * | 7/2007 | Davis | B60N 2/002 340/539.11 |
| 7,319,382 | B1 | * | 1/2008 | Vu | B60N 2/002 340/425.5 |
| 7,339,463 | B2 | * | 3/2008 | Donaldson | B60N 2/002 340/457 |
| 7,378,979 | B2 | * | 5/2008 | Rams, Jr. | B60N 2/002 180/271 |
| 7,714,737 | B1 | * | 5/2010 | Morningstar | B60N 2/002 180/271 |
| 7,786,852 | B2 | * | 8/2010 | Kautz | B60N 2/2812 340/425.5 |
| 8,044,782 | B2 | * | 10/2011 | Saban | B60N 2/002 340/438 |
| 8,063,788 | B1 | * | 11/2011 | Morningstar | B60N 2/002 180/271 |

(Continued)

FOREIGN PATENT DOCUMENTS

WO    2016127118    8/2016

*Primary Examiner* — Hoi C Lau
(74) *Attorney, Agent, or Firm* — Kyle A. Fletcher, Esq.

(57) ABSTRACT

The child car seat safety alarm is an alarm system. The child car seat safety alarm is configured for use with a child safety seat and a driver's seat. The child car seat safety alarm is configured to detect the weight of a first individual in the driver's seat. The child car seat safety alarm is configured to detect the weight of a second individual in the child safety seat. If the child car seat safety alarm detects the weight of the second individual in the child safety seat but does not detect the weight of the first individual, the child car seat safety alarm initiates a plurality audio and visual alarms to indicate that the second individual remains in the child safety seat. The child car seat safety alarm comprises a beacon module and a child safety seat module.

16 Claims, 5 Drawing Sheets

(56) References Cited

U.S. PATENT DOCUMENTS

| | | | |
|---|---|---|---|
| 8,836,491 B2* | 9/2014 | Rao | B60K 28/08 |
| | | | 340/426.13 |
| D744,248 S | 12/2015 | Pos | |
| 9,424,728 B2* | 8/2016 | Rambadt | B60N 2/002 |
| 9,545,856 B2 | 1/2017 | Borgne | |
| 9,663,032 B1* | 5/2017 | Appukutty | B60Q 9/00 |
| 9,770,962 B2* | 9/2017 | Quave | B60N 2/002 |
| 9,845,050 B1* | 12/2017 | Garza | B60Q 9/00 |
| 9,955,326 B2* | 4/2018 | Avrahami | H04L 67/12 |
| 2005/0030188 A1* | 2/2005 | Flanagan | B60R 99/00 |
| | | | 340/667 |
| 2007/0132571 A1* | 6/2007 | Rossi | B60N 2/002 |
| | | | 340/457 |
| 2016/0042624 A1* | 2/2016 | Quave | B60N 2/002 |
| | | | 340/457 |
| 2017/0282791 A1* | 10/2017 | Voorhies | B60N 2/90 |
| 2018/0009375 A1* | 1/2018 | Miles | B60Q 1/52 |
| 2018/0015841 A1 | 1/2018 | Borgne | |
| 2018/0065504 A1* | 3/2018 | Lan | B60N 2/002 |

\* cited by examiner

CHILD CAR SEAT SAFETY SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of transportation and vehicles including seats specially configured for vehicles, more specifically, a movable seat that further comprises electrical logic circuits.

SUMMARY OF INVENTION

The child car seat safety alarm is an alarm system. The child car seat safety alarm is configured for use with a vehicle. The vehicle is further defined with a child safety seat and a driver's seat. The child car seat safety alarm is configured to detect the weight of a first individual in the driver's seat. The child car seat safety alarm is configured to detect the weight of a second individual in the child safety seat. If the child car seat safety alarm detects the weight of the second individual in the child safety seat but does not detect the weight of the first individual, the child car seat safety alarm initiates a plurality audio and visual alarms to indicate that the second individual remains in the child safety seat. The child car seat safety alarm comprises a beacon module and a child safety seat module. The beacon module: a) detects the weight of the first individual in the driver's seat; and, b) transmits a signal to the child safety seat module indicating the first individual is in the driver's seat. The child safety seat: c) detects the weight of the second individual in the child safety seat; d) detects the transmitted signal from the beacon module; and; e) generates the audible and visual alarm.

These together with additional objects, features and advantages of the child car seat safety alarm will be readily apparent to those of ordinary skill in the art upon reading the following detailed description of the presently preferred, but nonetheless illustrative, embodiments when taken in conjunction with the accompanying drawings.

In this respect, before explaining the current embodiments of the child car seat safety alarm in detail, it is to be understood that the child car seat safety alarm is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the child car seat safety alarm.

It is therefore important that the claims be regarded as including such equivalent construction insofar as they do not depart from the spirit and scope of the child car seat safety alarm. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
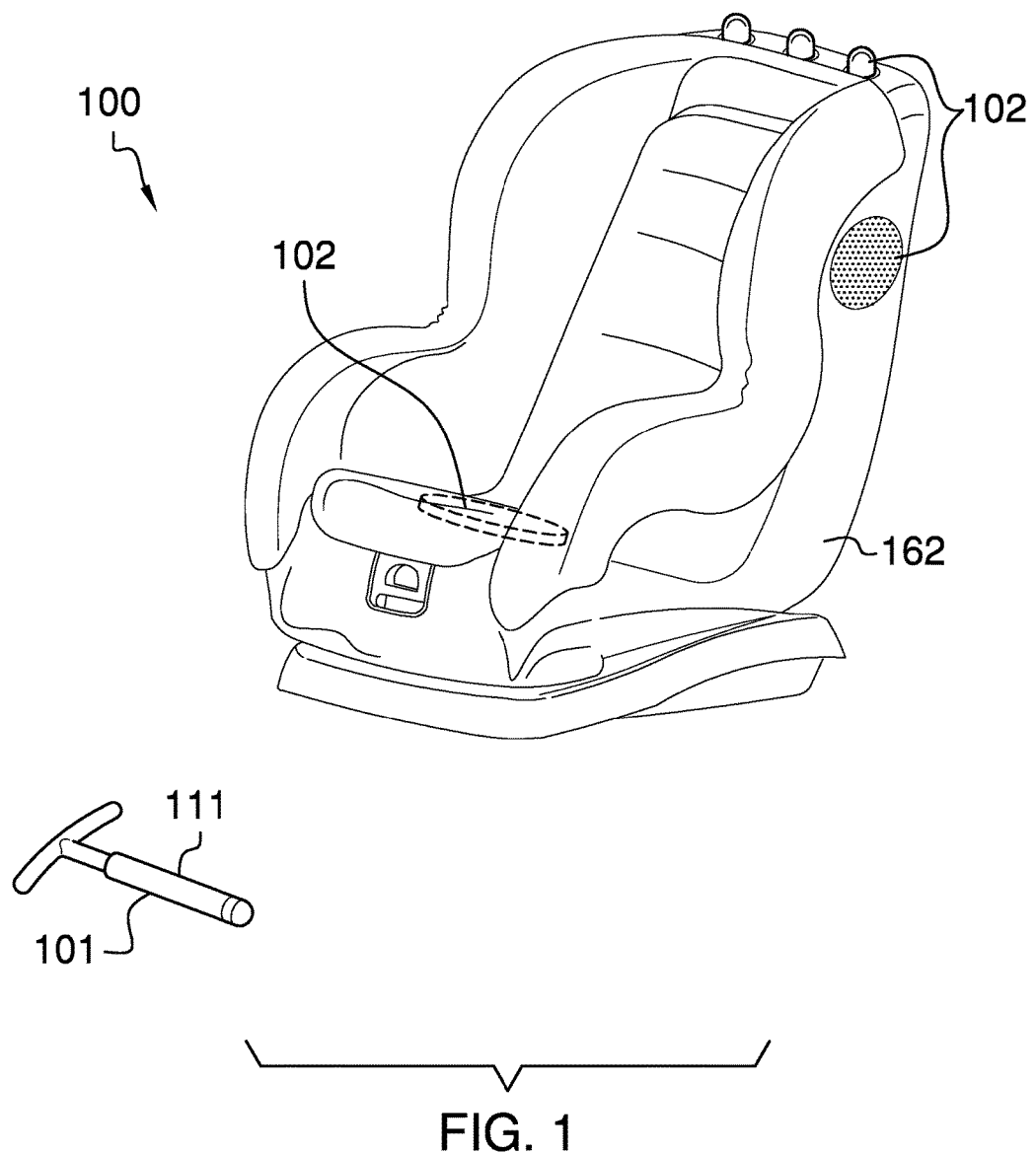
FIG. 1 is a perspective view of an embodiment of the disclosure.
Figure 2:
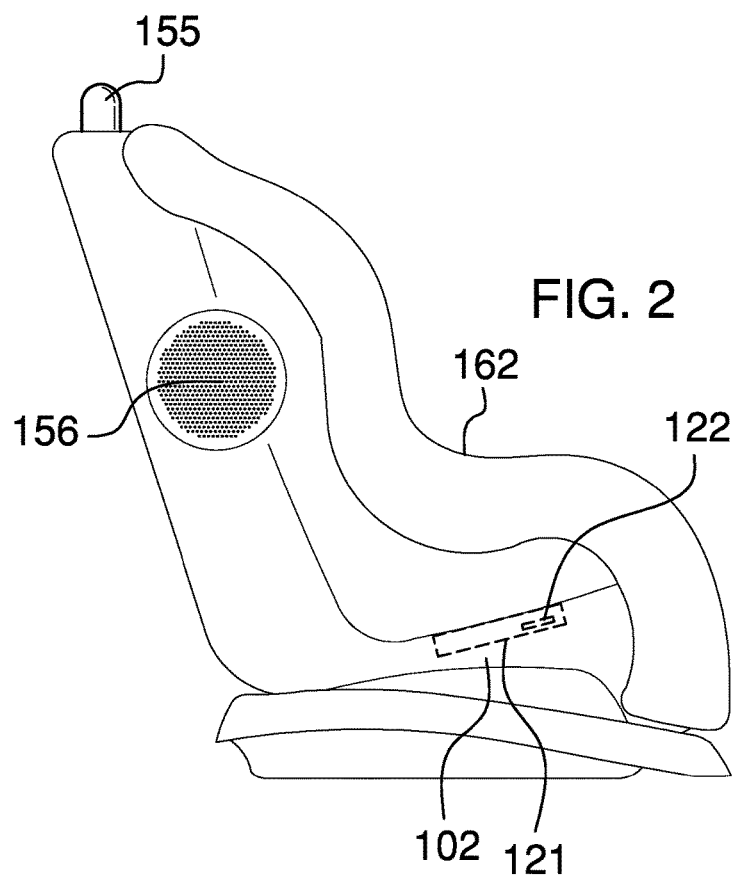
FIG. 2 is a side view of an embodiment of the disclosure.
Figure 3:
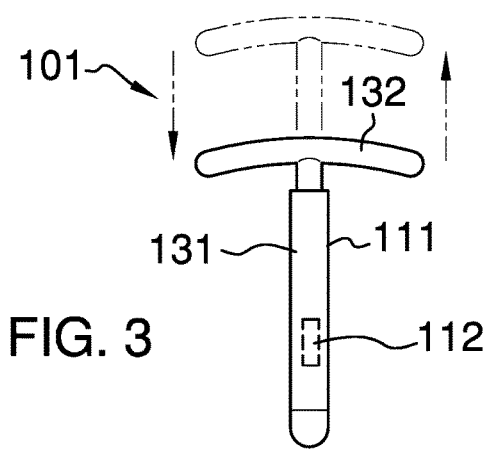
FIG. 3 is a detail view of an embodiment of the disclosure.
Figure 4:
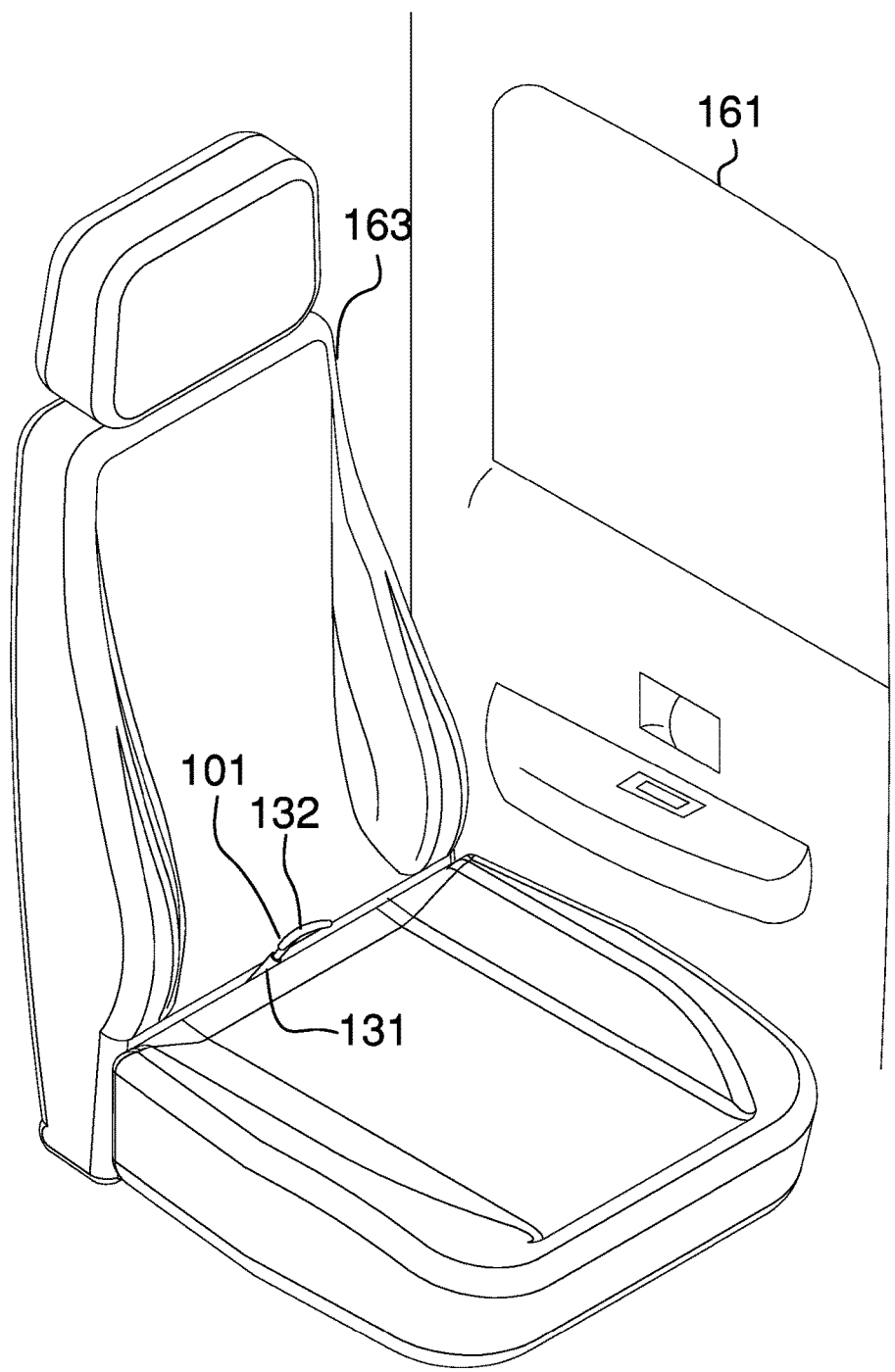
FIG. 4 is a detail view of an embodiment of the disclosure.
Figure 5:
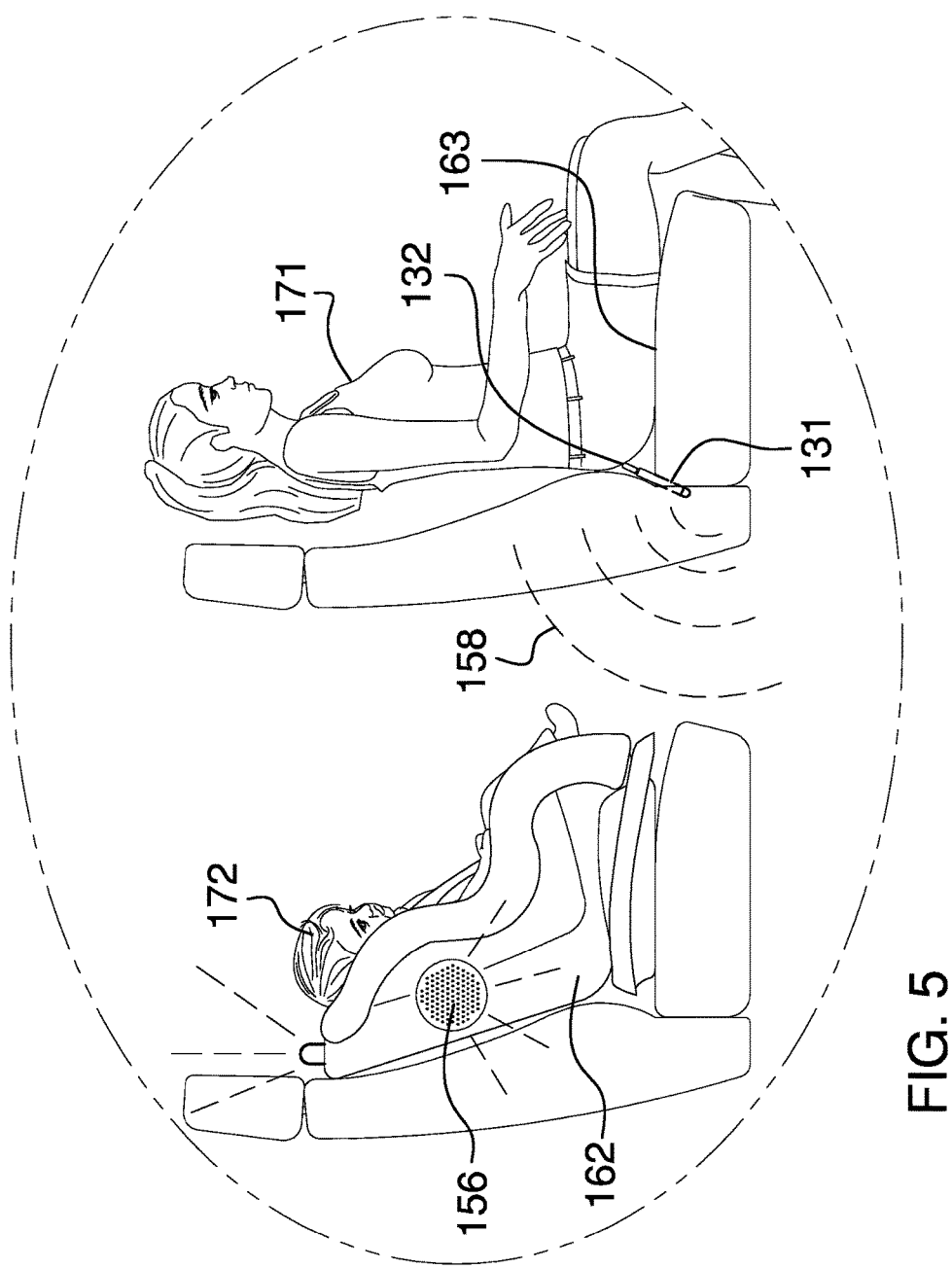
FIG. 5 is an in-use view of an embodiment of the disclosure.
Figure 6:
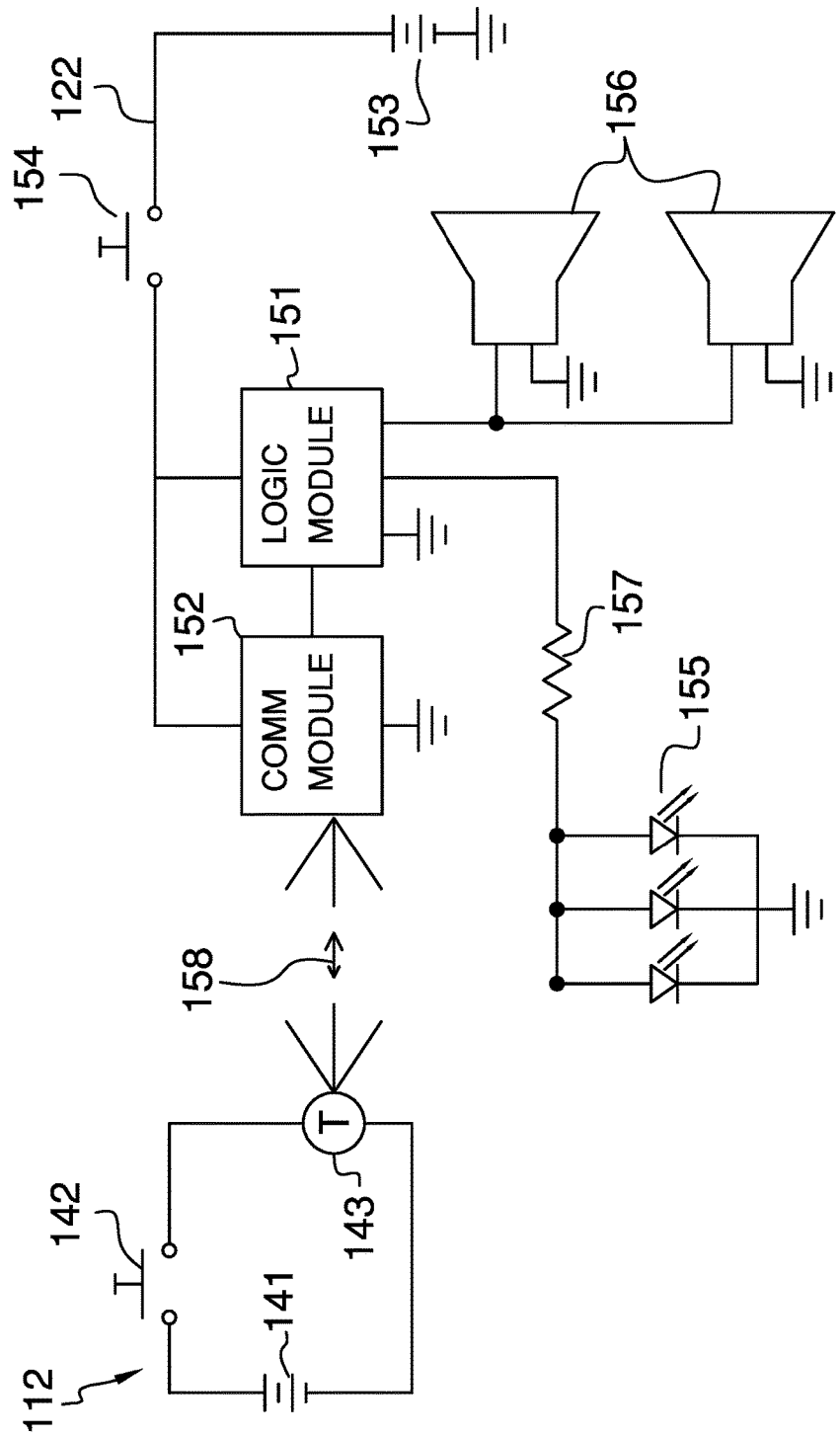
FIG. 6 is a block diagram of an embodiment of the disclosure.

Detailed reference will now be made to one or more potential embodiments of the disclosure, which are illustrated in FIGS. 1 through 6.

The child car seat safety alarm 100 (hereinafter invention) is an alarm system. The invention 100 is configured for use with a vehicle 161. The vehicle 161 is further defined with a child safety seat 162 and a driver's seat 163. The invention is configured to detect the weight of a first individual 171 in the driver's seat 163. The invention 100 is configured to detect the weight of a second individual 172 in the child safety seat 162. If the invention 100 detects the weight of the second individual 172 in the child safety seat 162 but does not detect the weight of the first individual 171, the invention 100 initiates a plurality audio and visual alarms to indicate that the second individual 172 remains in the child safety seat 162. The invention 100 comprises a beacon module 101 and a child safety seat 162 module 102. The beacon module 101: a) detects the weight of the first individual 171 in the driver's seat 163; and, b) transmits a signal to the child safety seat 162 module 102 indicating the first individual 171 is in the driver's seat 163. The child safety seat 162 module 102: c) detects the weight of the second individual 172 in the child safety seat 162; d) detects the transmitted signal from the beacon module 101; and; e) generates the audible and visual alarm.

The beacon module 101 is the element of the invention 100 that installs in the driver's seat 163 of the vehicle 161. The beacon module 101 detects the weight of a first individual 171 sitting in the driver's seat 163 of the vehicle 161. When the beacon module 101 detects the weight of the first individual 171, the beacon module 101 transmits a signal over a wireless communication link 158 to the child safety seat 162 module 102. The beacon module 101 comprises a tee housing 111 and a beacon circuit 112.

The tee housing 111 is a hollow structure. The tee housing 111 mounts in the driver's seat 163 of the vehicle 161. Specifically the tee housing 111 mounts between the bench and the backrest of the driver's seat 163. The tee housing 111 mounts in the driver's seat 163 such that the hollow interior volume of the tee housing 111 decreases when the first individual 171 is in the driver's seat 163.

The tee housing 111 is a casing. The tee housing 111 contains the beacon circuit 112. The tee housing 111 is formed with all apertures and form factors necessary to allow the tee housing 111 to accommodate the use and operation of the invention 100. The tee housing 111 further comprises a circuit cylinder 131 and a tee cylinder 132. Methods to form a housing suitable for the purposes described in this disclosure are well-known and documented in the mechanical arts.

The circuit cylinder 131 contains the beacon circuit 112. The circuit cylinder 131 is formed with all apertures and form factors necessary to allow the circuit cylinder 131 to accommodate the use and operation of the invention 100. The beacon circuit 112 installs in the circuit cylinder 131 of the tee housing 111. Methods to form a housing suitable for the purposes described in this disclosure are well-known and documented in the mechanical arts.

The tee cylinder 132 is a tee shaped structure. The tee cylinder 132 installs telescopically into the circuit cylinder 131. The motion of the tee cylinder 132 adjusts the interior volume of the tee housing 111. The tee cylinder 132 further comprises a cross cylinder 133 and a cantilever cylinder 134. The cross cylinder 133 forms the cross prism of the tee cylinder 132. The cantilever cylinder 134 forms the cantilever prism of the tee cylinder 132. The tee housing 111 installs in the driver's seat 163 of the vehicle 161 such that the back of the first individual 171 presses against the cross cylinder 133 of the tee cylinder 132.

The circuit cylinder 131 is a hollow first prism. The circuit cylinder 131 forms a capped tube that is further defined with an inner dimension and an open end. The cantilever cylinder 134 is a second prism that is further defined with an outer dimension. The circuit cylinder 131 and the cantilever cylinder 134 are geometrically similar. The outer dimension of the cantilever cylinder 134 is less than the inner dimension of the circuit cylinder 131 such that the cantilever cylinder 134 inserts into the open end of the circuit cylinder 131 in a telescopic manner. This telescopic arrangement allows the cantilever cylinder 134 to move within the circuit cylinder 131. The position of the cantilever cylinder 134 within the circuit cylinder 131 determines whether the driver's seat 163 is occupied.

The beacon circuit 112 is an electric circuit. The beacon circuit 112 detects the weight of the first individual 171 in the driver's seat 163. On detection of the weight of the first individual 171, the beacon circuit 112 initiates the transmission of the signal over the wireless communication link 158.

The beacon circuit 112 further comprises a beacon power source 141, a beacon pressure switch 142, and a transmitter 143.

The beacon power source 141 is an externally provisioned power source. This disclosure assumes that the beacon power source 141 is selected from the group consisting of a battery and the vehicle 161 electrical system. The beacon power source 141 provides electrical energy for the operation of the transmitter 143.

The transmitter 143 is a commercially available radio frequency transmitting circuit that is used to generate the signal transmitted by the beacon module 101.

The beacon power source 141, the beacon pressure switch 142, and the transmitter 143 form a series circuit such that the closure of the beacon pressure switch 142 provides the power that initiates the operation of the transmitter 143.

The beacon pressure switch 142 is a commercially available pressure switch. The free end of the cantilever cylinder 134 attaches to the beacon pressure switch 142 of the beacon circuit 112 such that the weight of the first individual 171 in the driver's seat 163 will actuate the beacon pressure switch 142 into a closed position.

The child safety seat 162 module 102 is the element of the invention 100 that installs in the child safety seat 162. The child safety seat 162 module 102 detects the weight of a second individual 172 sitting in the child safety seat 162.

When the child safety seat 162 module 102 detects the weight of the second individual 172 in the child safety seat 162, the child safety seat 162 module 102 initiates the monitoring of the wireless communication link 158 for a signal from the beacon module 101. The child safety seat 162 module 102 takes no action while the child safety seat 162 module 102 detects the transmitted signal from the beacon module 101 over the wireless communication link 158. If the child safety seat 162 module 102 fails to detect the transmitted signal from the beacon module 101 over the wireless communication link 158, the child safety seat 162 module 102 activates visual and audible alarms.

The theory of operation of the child safety seat 162 module 102 assumes that the lack of detection of the weight of a first individual 171 in the driver's seat 163 of the vehicle 161 while the weight of the second individual 172 is detected in the child safety seat 162 implies that the second individual 172 has been left by the first individual 171 in an unsupervised situation that should be brought to the attention of the first individual 171.

The child safety seat 162 module 102 comprises a CSS housing 121 and a CSS circuit 122.

The CSS housing 121 is a hollow casing. The CSS housing 121 contains the CSS circuit 122. The CSS housing 121 is formed with all apertures and form factors necessary to allow the CSS housing 121 to accommodate the use and operation of the invention 100. The CSS housing 121 is a rectangular block structure placed on the bench of the child safety seat 162 underneath the cushion of the child safety seat 162 that the second individual 172 rests on. Methods to form a housing suitable for the purposes described in this disclosure are well-known and documented in the mechanical arts.

The CSS circuit 122 further comprises a logic module 151, a communication module 152, a CSS power source 153, a CSS pressure switch 154, a plurality of LEDs 155, one or more speakers 156, a limit resistor 157, and a wireless communication link 158.

The logic module 151 is a readily and commercially available programmable electronic device that is used to manage, regulate, and operate the CSS circuit 122. Depending on the specific design and the selected components, the logic module can be a separate component within the CSS circuit 122 or the functions of the logic module 151 can be incorporated into another component within the CSS circuit 122. The communication module 152 is a wireless electronic communication device that allows the logic module 151 to wirelessly communicate with the beacon circuit 112. Specifically, the communication module 152 establishes a wireless communication link 158 between the CSS circuit 122 and the transmitter 143 of the beacon circuit 112. In the first potential embodiment of the disclosure, the communication module 152 and the transmitter 143 support a communication protocol selected from the group consisting of a WiFi protocol or a Bluetooth protocol.

The CSS power source 153 is an externally provisioned power source. This disclosure assumes that the CSS power source 153 is selected from the group consisting of a battery and the vehicle 161 electrical system. The CSS power source 153 provides electrical energy for the balance of the CSS circuit 122.

The CSS pressure switch 154 is a commercially available pressure switch that physically attaches to the bench of the child safety seat 162. The CSS pressure switch 154 is actuated when the weight of the second individual 172 is placed in the child safety seat 162. The CSS pressure switch 154 is placed in series between the CSS power source 153 and the balance of the CSS circuit 122 such that the closure of the CSS pressure switch 154 provides the power that initiates the operation of the CSS circuit 122.

The plurality of LEDs 155 generate visible illumination when the first individual 171 is not in the driver's seat 163 while the second individual 172 remains in the child safety seat 162. The illumination of the plurality of LEDs 155 is controlled by the logic module 151. The use of a plurality of LEDs 155 for generating visible alarms is well-known and documented in the electrical arts. The limit resistor 157 is a resistor that is placed in series between the plurality of LEDs 155 and the logic module 151. The limit resistor 157 limits the flow of electricity into the plurality of LEDs 155.

Each of the one or more speakers 156 is a transducer that converts an electrical signal received from the logic module 151 into an audible sound used as an alarm. The one or more speakers 156 generates the audible alarm when the first individual 171 is not in the driver's seat 163 while the second individual 172 remains in the child safety seat 162. The one or more speakers 156 is controlled by the logic module 151. The use of a one or more speakers 156 for generating audible alarms is well-known and documented in the electrical arts.

The following definitions were used in this disclosure:

AC: As used in this disclosure, AC is an acronym for alternating current.

Backrest: As used in this disclosure, a backrest is a vertical supporting surface formed in a chair or seat.

Battery: As used in this disclosure, a battery is a chemical device consisting of one or more cells, in which chemical energy is converted into electricity and used as a source of power. Batteries are commonly defined with a positive terminal and a negative terminal.

Beacon: As used in this disclosure, a beacon refers to a detectable signal that draws the attention of a person or a device to a location. A beacon is commonly used as a guide to the location or as a warning signal about the location.

Bench: As used in this disclosure, a bench is a horizontal supporting surface formed by a chair.

Bluetooth: As used in this disclosure, Bluetooth is a standardized communication protocol that is used to wirelessly interconnect electronic devices.

Cantilever: As used in this disclosure, a cantilever is a beam or other structure that projects away from an object and is supported on only one end. A cantilever is further defined with a fixed end and a free end. The fixed end is the end of the cantilever that is attached to the object. The free end is the end of the cantilever that is distal from the fixed end.

Capped Tube: As used in this disclosure, a capped tube is a tube with one closed end and one open end.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Chair: As used in this disclosure, a chair is a structure that a person can sit on. Seat is a common synonym for a chair. A chair commonly comprises a bench and a backrest.

Child Safety Seat: As used in this disclosure, a child safety seat is a safety device configured for use with an automobile. The child safety seat is a restraining device that protects a child from injury should an unfortunate event occur to the automobile.

Correspond: As used in this disclosure, the term correspond is used as a comparison between two or more objects wherein one or more properties shared by the two or more objects match, agree, or align within acceptable manufacturing tolerances.

CSS: As used in this disclosure, CSS is an abbreviation for child safety seat.

DC: As used in this disclosure, DC is an acronym for direct current.

Diode: As used in this disclosure, a diode is a two terminal semiconductor device that allows current flow in only one direction. The two terminals are called the anode and the cathode. Electric current is allowed to pass from the anode to the cathode.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1. Always use Correspond and One to One Housing: As used in this disclosure, a housing is a rigid casing that encloses and protects one or more devices.

Inner Dimension: As used in this disclosure, the term inner dimension describes the span from a first inside or interior surface of a container to a second inside or interior surface of a container. The term is used in much the same way that a plumber would refer to the inner diameter of a pipe.

LED: As used in this disclosure, an LED is an acronym for a light emitting diode. A light emitting diode is a diode that is also a light source.

Limit Resistor: As used in this disclosure, a limit resistor is an electrical resistor that is used to limit the flow of electric current through an electrical circuit.

Logic Module: As used in this disclosure, a logic module is a readily and commercially available electrical device that is programmable and that accepts digital and analog inputs, processes the digital and analog inputs according to previously stored instruction and provides the results of these instructions as digital or analog outputs.

One to One: When used in this disclosure, a one to one relationship means that a first element selected from a first set is in some manner connected to only one element of a second set. A one to one correspondence means that the one to one relationship exists both from the first set the second set and from the second set to the first set. A one to one fashion means that the one to one relationship exists in only one direction.

Outer Dimension: As used in this disclosure, the term outer dimension describes the span from a first exterior or outer surface of a tube or container to a second exterior or outer surface of a tube or container. The term is used in much the same way that a plumber would refer to the outer diameter of a pipe.

Power Source: As used in this disclosure, a power source is a source of the energy that enables the operation of the present disclosure. Examples of external power sources include, but are not limited to, electrical power sources and compressed air sources.

Pressure Switch: As used in this disclosure, a pressure switch is an electrical switch that actuated by an applied pressure.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Radial: As used in this disclosure, the term radial refers to a direction that: 1) is perpendicular to an identified central axis; or, 2) projects away from a center point.

Resistor: As used in this disclosure, a resistor is a well-known and commonly available electrical device that inhibits the flow of electricity through an electric circuit. Within an electric circuit processing alternating currents, the resistor will not affect the phase of the alternating current. A current flowing through a resistor will create a voltage across the terminals of the resistor.

Speaker: As used in this disclosure, a speaker is an electrical transducer that converts an electrical signal into an audible sound.

Tee Shape: As used in this disclosure, the term Tee shape refers to a structure formed from a cross prism and a cantilever prism where in the cantilever prism attaches to the cross prism such that: a) the cantilever prism attaches to the cross prism in the manner of a cantilever; and, b) the center axis of the cantilever prism intersects with a projects radially away from the center point of the center axis of the cross prism.

Telescopic: As used in this disclosure, telescopic is an adjective that describes an object made of sections that fit or slide into each other such that the object can be made longer or shorter by adjusting the relative positions of the sections.

Transducer: As used in this disclosure, a transducer is a device that converts a physical quantity, such as pressure or brightness into an electrical signal or a device that converts an electrical signal into a physical quantity.

Transmitter: As used in this disclosure, a transmitter is a device that is used to generate and transmit electromagnetic radiation such as radio signals.

Tube: As used in this disclosure, the term tube is used to describe a rigid hollow prism with two open ends. While tubes that are suitable for use in this disclosure are often used to transport or conveys fluids or gases, the purpose of the tubes in this disclosure are structural. In this disclosure, the terms inner dimension and outer dimension of a tube are used as they would be used by those skilled in the plumbing arts.

Unfortunate Event: As used in this disclosure, an unfortunate event is an incident that: 1) happens unexpectedly; 2) happens unintentionally; and, 3) has the potential to cause injury and or property damage.

Vehicle: As used in this disclosure, a vehicle is a motorized device used for transporting passengers, goods, or equipment. The term motorized vehicle refers to a vehicle can move under power provided by an electric motor or an internal combustion engine.

WiFi: As used in this disclosure, WiFi refers to the physical implementation of a collection of wireless electronic communication standards commonly referred to as IEEE 802.11x.

Wireless: As used in this disclosure, wireless is an adjective that is used to describe a communication channel between two devices that does not require the use of physical cabling.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A movable seat comprising:
a beacon module and a child safety seat module;
wherein the beacon module and the child safety seat form a wireless communication link;
wherein the movable seat is configured for use with a vehicle;
wherein the vehicle is further defined with a child safety seat and a driver's seat;
wherein the beacon module installs in the driver's seat of the vehicle;
wherein the child safety seat module installs in the child safety seat;
wherein the beacon module: a) detects the weight of a first individual in the driver's seat; and, b) transmits a signal over the wireless communication link to the child safety seat module;
wherein the child safety seat module: c) detects the weight of a second individual in the child safety seat; d) detects the transmitted signal from the beacon module; and; e) generates the audible and visual alarm;
wherein if the child seat module detects the weight of the second individual in the child safety seat but does not detect the weight of the first individual, the child seat module initiates a plurality audio and visual alarms to indicate that the second individual remains in the child safety seat;
wherein the beacon module comprises a tee housing and a beacon circuit;
wherein the tee housing contains the beacon circuit;
wherein the tee housing mounts in the driver's seat of the vehicle;
wherein the tee housing is a hollow structure;
wherein the tee housing mounts in the driver's seat such that the hollow interior volume of the tee housing decreases when the first individual is in the driver's seat.

2. The movable seat according to claim 1
wherein the tee housing further comprises a circuit cylinder and a tee cylinder;
wherein the tee cylinder is a tee shaped structure;
wherein the tee cylinder installs telescopically into the circuit cylinder;
wherein the circuit cylinder is a capped tube;
wherein the circuit cylinder contains the beacon circuit.

3. The movable seat according to claim 2
wherein the tee cylinder further comprises a cross cylinder and a cantilever cylinder;
wherein the cross cylinder forms the cross prism of the tee cylinder;
wherein the cantilever cylinder forms the cantilever prism of the tee cylinder;
wherein the tee housing installs in the driver's seat of the vehicle such that the back of the first individual presses against the cross cylinder of the tee cylinder.

4. The movable seat according to claim 3
wherein the circuit cylinder is a hollow first prism;
wherein the circuit cylinder is further defined with an inner dimension and an open end;
wherein the cantilever cylinder is a second prism;
wherein the cantilever cylinder that is further defined with an outer dimension;
wherein the circuit cylinder and the cantilever cylinder are geometrically similar;
wherein the outer dimension of the cantilever cylinder is less than the inner dimension of the circuit cylinder such that the cantilever cylinder inserts into the open end of the circuit cylinder in a telescopic manner;
wherein the position of the cantilever cylinder within the circuit cylinder determines whether the driver's seat is occupied.

5. The movable seat according to claim 4
wherein the beacon circuit is an electric circuit;
wherein the beacon circuit detects the weight of the first individual in the driver's seat;
wherein on detection of the weight of the first individual, the beacon circuit initiates the transmission of the signal over the wireless communication link.

6. The movable seat according to claim 5
wherein the beacon circuit further comprises a beacon power source, a beacon pressure switch, and a transmitter;
wherein the beacon power source, the beacon pressure switch and the transmitter are electrically interconnected.

7. The movable seat according to claim 6
wherein the beacon power source provides electrical energy for the operation of the transmitter;
wherein the transmitter is a radio frequency transmitting circuit that generates the signal transmitted by the beacon module;
wherein the beacon power source, the beacon pressure switch, and the transmitter form a series circuit such that the closure of the beacon pressure switch provides the power that initiates the operation of the transmitter.

8. The movable seat according to claim 7 wherein the free end of the cantilever cylinder attaches to the beacon pressure switch of the beacon circuit such that the weight of the first individual in the driver's seat will actuate the beacon pressure switch into a closed position.

9. The movable seat according to claim 8
wherein the child safety seat module comprises a CSS housing and a CSS circuit;
wherein the CSS housing contains the CSS circuit;
wherein the CSS housing is a rectangular block structure placed on the child safety seat.

10. The movable seat according to claim 9
wherein the CSS circuit comprises a logic module, a communication module, a CSS power source, a CSS pressure switch, a plurality of LEDs, one or more speakers, a limit resistor, and the wireless communication link;
wherein the CSS power source provides electrical energy for the balance of the CSS circuit;
wherein the logic module, the communication module, the CSS power source, the CSS pressure switch, the plurality of LEDs, the one or more speakers, and the limit resistor are electrically interconnected.

11. The movable seat according to claim 10
wherein the logic module is a programmable electronic device
wherein the communication module is a wireless electronic communication device;
wherein the communication module establishes the wireless communication link between the CSS circuit and the transmitter of the beacon circuit.

12. The movable seat according to claim 11
wherein the CSS pressure switch physically attaches to the bench of the child safety seat;

wherein the CSS pressure switch is actuated when the weight of the second individual is placed in the child safety seat.

13. The movable seat according to claim 12 wherein the CSS pressure switch is placed in series between the CSS power source and the balance of the CSS circuit such that the closure of the CSS pressure switch provides the power that initiates the operation of the CSS circuit.

14. The movable seat according to claim 13
wherein the plurality of LEDs generate visible illumination;
wherein the illumination of the plurality of LEDs is controlled by the logic module.

15. The movable seat according to claim 14
wherein the limit resistor is a resistor placed in series between the plurality of LEDs and the logic module;
wherein the limit resistor limits the flow of electricity into the plurality of LEDs.

16. The movable seat according to claim 15
wherein each of the one or more speakers is a transducer;
wherein each of the one or more speakers converts an electrical signal into an audible sound used as an alarm;
wherein the one or more speakers is controlled by the logic module.

* * * * *